US009020022B1

(12) United States Patent
Warner (10) Patent No.: US 9,020,022 B1
(45) Date of Patent: Apr. 28, 2015

(54) ANALOG FINITE IMPULSE RESPONSE ADAPTATION METHOD AND APPARATUS

(71) Applicant: PMC-Sierra US, Inc., Sunnyvale, CA (US)

(72) Inventor: William D. Warner, Maple Ridge (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/957,852

(22) Filed: Aug. 2, 2013

(51) Int. Cl.
*H04L 27/01* (2006.01)
*H04L 7/00* (2006.01)

(52) U.S. Cl.
CPC .............. *H04L 27/01* (2013.01); *H04L 7/0058* (2013.01)

(58) Field of Classification Search
CPC .................................................... H04L 7/0058
USPC .......................................................... 375/232
See application file for complete search history.

(56) References Cited

U.S. PATENT DOCUMENTS

| 8,243,782 | B2 * | 8/2012 | Mobin et al. ................... 375/232 |
| 8,428,113 | B1 | 4/2013 | Katic et al. |
| 2002/0027963 | A1 | 3/2002 | Imanaka et al. |
| 2008/0049350 | A1 | 2/2008 | Bruner et al. |
| 2009/0304064 | A1 | 12/2009 | Liu et al. |
| 2010/0008414 | A1 * | 1/2010 | Lee et al. ....................... 375/233 |
| 2010/0177816 | A1 * | 7/2010 | Malipatil et al. ............... 375/233 |
| 2010/0329319 | A1 | 12/2010 | Dai et al. |
| 2010/0329322 | A1 * | 12/2010 | Mobin et al. ................... 375/231 |
| 2012/0076508 | A1 | 3/2012 | Mezer et al. |
| 2012/0269305 | A1 | 10/2012 | Hogeboom et al. |
| 2013/0101000 | A1 * | 4/2013 | Warke et al. ................... 375/222 |
| 2013/0202022 | A1 * | 8/2013 | Cai ................................. 375/232 |
| 2013/0287088 | A1 * | 10/2013 | Mobin et al. ................... 375/233 |

OTHER PUBLICATIONS

Carusone, "An Equalizer Adaptation Algorithm to Reduce Jitter in Binary Receivers", IEEE Transactions on Circuits & Systems II, Sep. 2006, pp. 807-811, vol. 53, No. 9.
Wong et al., "Modified LMS Adaptation Algorithm for a Discrete-Time Edge Equalizer of Serial I/O", IEEE Asian Solid-State Circuits Conference (ASSCC), Nov. 13-15, 2006, pp. 387-390, Hangzhou, China.
Toifl et al., "Low-Complexity Adaptive Equalization for High-Speed Chip-to-Chip Communication Paths by Zero-Forcing of Jitter Components", IEEE Transactions on Communications, Sep. 2006, pp. 1554-1557, vol. 54, No. 9.
Brunn, "Edge-equalized NRZ", Online: http://www.ieee802.org/3/ap/public/jul04/brunn_01_0704.pdf, 2004,11 pages, HP Labs, Palo Alto, CA.

(Continued)

*Primary Examiner* — Santiago Garcia
(74) *Attorney, Agent, or Firm* — Dennis R. Haszko (57) ABSTRACT

A SerDes receiver comprising: an input for receiving a signal, the signal having a baud rate; an Analog Finite Impulse Response equalizer (AFIR) for equalizing the received signal, the AFIR comprising: a pre-cursor tap having a pre-cursor coefficient; a cursor tap having a cursor coefficient, the cursor coefficient being constrained to a non-negative value; and a post-cursor tap having a post-cursor coefficient; an adaptation block coupled to the AFIR, the adaptation block configured to adjust the pre-cursor coefficient and the post-cursor coefficient based on the received signal, the adaptation block further being configured to constrain the values of the pre-cursor and post-cursor coefficients to be non-positive.

11 Claims, 4 Drawing Sheets

(56) References Cited

OTHER PUBLICATIONS

Boyd et al., "Common Electrical I/O (CEI)—Electrical and Jitter Interoperability agreements for 6G+ bps, 11G+ bps and 25G+ bps I/O", Optical Internetworking Forum (OIF), OIF-CEI-03.0, Sep. 1, 2011, 242 pages.

Cox et al., "Information technology—Serial Attached SCSI-3 (SAS-3)", Working Draft American National Standards Institute (ANSI) Project T10/2212-D, Jan. 31, 2013, 325 pages, Global Engineering Documents, an IHS Company, Englewood, CO.

Gardner, "A BPSK/QPSK Timing-Error Detector for Sampled Receivers", IEEE Transactions on Communications, May 1986, pp. 423-429, vol. COM-34, No. 5.

Cox et al., "Information technology—Serial Attached SCSI-3 (SAS-3)", Working Draft—American National Standard—Project T10/BSR INCITS 519, American National Standards Institute (ANSI), Nov. 7, 2013, 340 pages, Global Engineering Documents, an IHS Company, Englewood, CO.

Eshet et al., "An Adaptive 4-Tap Analog FIR Equalizer for 10-Gb/s Over Backplane Serial Link Receiver", Solid-State Circuits Conference, Sep. 15-19, 2008, pp. 178-181, Edinburgh.

Ungerboeck, "Fractional Tap-Spacing Equalizer and Consequences for Clock Recovery", IEEE Transactions on Communications, Aug. 1976, pp. 856-864, vol. COM-24, No. 8.

\* cited by examiner

ANALOG FINITE IMPULSE RESPONSE ADAPTATION METHOD AND APPARATUS

FIELD

The present disclosure relates generally to receivers. More particularly, the present disclosure relates to SerDes receivers incorporating Analog Finite Impulse Response (FIR) filters.

BACKGROUND

High speed data communication between physically separated integrated components is a common function in communication infrastructure systems. The separated integrated circuits could be physically separated on a common circuit board, or on separate circuit boards connected by a backplane, cable, or other communication medium.

As the data rate increases, as the physical separation distance increases, and/or the quality of the communication medium decreases, the transmitted signal will be increasingly impaired by a process commonly called Inter-Symbol Interference (ISI). ISI effectively smears the transmitted pulse waveform such that, at the receiver, each received pulse contains portions of signal energy from previously transmitted symbols (called Post-Cursor ISI) and may even contain portions of signal energy from symbols yet to be received (called Pre-Cursor ISI).

The phenomenon of ISI is well understood by those knowledgeable in the art. It is also well known that the impairment process of ISI can largely be mitigated through the use of equalizers, whether they are analog equalizers, digital equalizers, or combination of both. Within the scope of digital equalization, the equalizer can be in the form of a Finite Impulse Response (FIR), Infinite Impulse Response (IIR), Decision Feedback Equalizer (DFE), among others. Within the scope of analog equalization, the equalizer can be in the form of a Continuous Time Linear Equalizer (CTLE), Analog FIR, among others.

The above information is presented as background information only to assist with an understanding of the present disclosure. No determination has been made, and no assertion is made, as to whether any of the above might be applicable as prior art with regard to the present invention.

BRIEF DESCRIPTION OF THE DRAWINGS

Embodiments of the present disclosure will now be described, by way of example only, with reference to the accompanying figures.

DETAILED DESCRIPTION

Generally, disclosed herein is a novel method to adapt Analog Finite Impulse Response (AFIR) filters at low baud rates, which will enable the use of an Analog FIR at flexible rates in more SerDes applications. The method uses a constrained range of allowable analog FIR coefficient values where the constraints force a monotonic high pass response. The disclosed Analog FIR adaption method does not fight with timing recovery even at low baud rates.

In various embodiments, the present disclosure provides A SerDes receiver comprising: an input for receiving a signal, the signal having a baud rate; an Analog Finite Impulse Response equalizer (AFIR) for equalizing the received signal, the AFIR comprising: a pre-cursor tap having a pre-cursor coefficient; a cursor tap having a cursor coefficient, the cursor coefficient being constrained to a non-negative value; and a post-cursor tap having a post-cursor coefficient; an adaptation block coupled to the AFIR, the adaptation block configured to adjust the pre-cursor coefficient and the post-cursor coefficient based on the received signal, the adaptation block further being configured to constrain the values of the pre-cursor and post-cursor coefficients to be non-positive. In some embodiments, the cursor coefficient is set to a fixed value, which may be, for example, 1.

In some embodiments, the sum of the pre-cursor, cursor, and post-cursor coefficients is constrained to be greater than K, wherein K is greater than 0. Some embodiments include a variable gain amplifier (VGA) for amplifying the received signal. In some embodiments, the input of the VGA is coupled to the output of the AFIR in order to amplify the received signal after equalization. In other embodiments, the output of the VGA is coupled to the input of the AFIR in order amplify the received signal prior to equalization.

In some embodiments, the sum of the pre-cursor, cursor, and post-cursor coefficients is constrained to be greater than K, wherein K is greater than 0. K is selected based on a maximum peaking gain of the AFIR, according to the relationship:

$$K = \frac{2C}{10^{(MaxPeakingGain_{dB}/20)} + 1}.$$

In some embodiments, where for example the cursor coefficient is set to 1, K is selected based on a maximum peaking gain of the AFIR, according to the relationship:

$$K = \frac{2}{10^{(MaxPeakingGain_{dB}/20)} + 1}.$$

In some embodiments, the SerDes receiver further comprises a digitizing block, which may be for example, but not limited to, an analog to digital converter (ADC) or a slicer.

Often, a complicating issue is that the characteristic response of the transmission channel is unknown and can change from one installation to another or over time. In these cases, a calibration, or adaptation process must be implemented to determine the required configuration of the receive equalizer. In some embodiments, the output of the VGA is coupled to the output of the AFIR Another complicating factor is that a given receiver may have to operate at one of a wide range of data rates, for example depending upon which transmitter it is connected to and what rate of communication is negotiated. Channel equalization settings for one data rate may not be appropriate for a different data rate.

In summary, a robust means for configuring and/or adapting the receiver equalizer over a wide range of operating data rates is a function that is critical to acceptable performance.

The receive equalizer can be implemented as in O. Eshet, A. Ran, A. Mezer, Y. Hadar, D. Lazar, M. Moyal, "An adaptive 4-tap analog FIR Equalizer for 10 Gb/s Over Backplane Serial Link Receiver", 34th European Solid-State Circuits Conference (ESSCIRC), 2008 (hereinafter "Eshet"), which is incorporated herein by reference in its entirety. When the receive equalizer is implemented as an analog FIR such as in Eshet, an additional complication is that the tap spacing is fixed by design and is not adjustable for operation at different data rates. If the analog FIR is designed to operate as a baud spaced FIR at the highest supported data rate, the said analog FIR becomes fractional at lower data rates. Those skilled in the art know from G. Ungerboeck, "Fractional Tap-Spacing Equalizer and Consequences for Clock Recovery in Data Modems", IEEE Transactions on Communications, Vol. Com-24, NO. 8, August 1976 (hereinafter "Ungerboeck"), which is incorporated herein by reference in its entirety, that fractional filters can impart timing offset and thus can interact in a detrimental way with timing recovery. Thus an important consideration in adapting an analog FIR equalizer at relatively low baud rates of operation is the potential conflict with timing recovery operation.

The method to adapt an Analog FIR equalizer, when the tap spacing of the Analog FIR is approximately equal to the baud duration, is known to those skilled in the art. For example, the method of Zero-Forcing adaptation of digital FIR equalizers given by J. G. Proakis, *Digital Communications*, 2nd Ed, McGraw-Hill, Inc., 1989 (hereinafter "Proakis"), which is incorporated herein by reference in its entirety, can be applied to an Analog FIR equalizer without modification. Those skilled in the art will recognize that the Zero-Forcing algorithm is a modified form of the more common Least Mean Square (LMS) adaptation algorithm, in which the sample values of the un-equalized input signal are replaced with their post-equalized decoded symbol values. Unlike the digital FIR case, in which the sample values of the un-equalized input signal are generally known, the input signal to the Analog FIR is not usually known, hence the necessity to use the Zero-Forcing algorithm instead of the LMS algorithm.

Figure 1A:
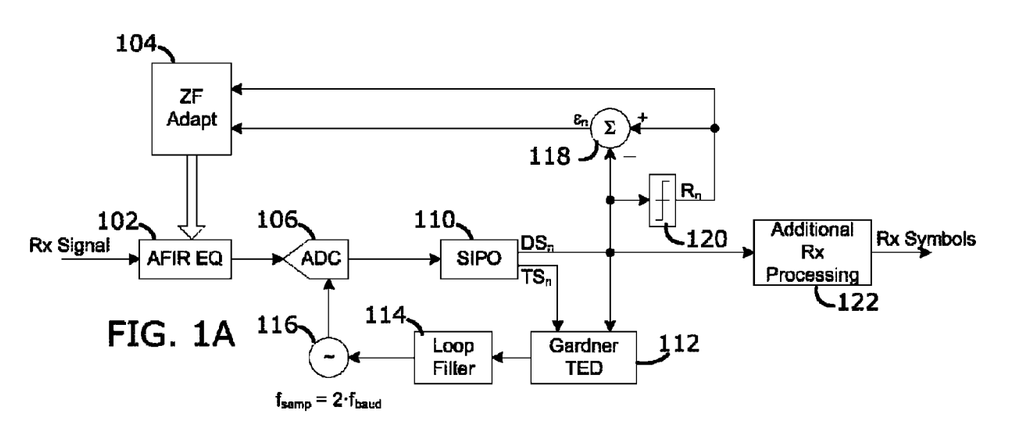
FIG. 1A illustrates a block diagram of a known receiver.

FIG. 1A shows a known system adapting a baud rate Analog FIR using the Zero-Forcing algorithm. More specifically, FIG. 1A illustrates a block diagram of a receiver 100 for use in a Ser/Des. Receiver 100 includes an analog FIR 102, Zero-Forcing Adaptation block ("ZF block") 104, an analog to digital converter 106, SIPO 110, a Gardner TED 112, a loop filter 114, sampling signal source 116, a summer 118 for generating a computed slicer error, $\epsilon_n$, and slicer 120 for generating an estimate of the communicated symbol, $R_n$. The receiver can also include an additional processing block 122 for further processing of the received signal.

The output of the Analog FIR EQ 102 is sampled using a multi-bit ADC 106 at a frequency that is twice the baud rate such that one set of alternating samples is aligned with the zero crossing transition between consecutive baud symbols and the other set of alternating samples is aligned with the center of the baud period.

At very high data rates, it is often necessary to process multiple samples simultaneously due to restrictions in achievable clocking rates of digital circuits. At a minimum, the ADC samples can be passed through a 1:2 SIPO which outputs a pair of samples at a clock rate that is 50% of the ADC sampling rate. Conceptually, data processing is still serial in this case as only one baud interval is processed at a time. More commonly, SIPO rates of 1:16 or higher are used and multiple baud periods are processed simultaneously to further reduce the clocking rate of the digital circuit.

It is also common to have multiple ADCs arranged in parallel. Each ADC is clocked at a slower rate with the aggregate sample rate equal to twice the baud rate (i.e. $2F_{baud}$). The sample clocks to each ADC are staggered in time.

Using techniques known to those skilled in the art, the ADC data is used to drive a timing recovery loop that adjusts the phase and frequency of the ADC sample clock to achieve this desired alignment. One example method uses a Gardner Timing Error Detector (TED) 112 (see e.g. F. M. Gardner, "A BPSK/QPSK Timing-Error Detector for Sampled Receivers", IEEE Transactions on Communications, Vol. COM-34, No. 5, May 1986, which is incorporated herein by reference in its entirety) and a first or second order loop filter 114 as illustrated in FIG. 1A. The baud centered samples, DSn, can be further processed as needed to recover the communicated information. The baud centered samples, DSn, are also used to adapt the Analog FIR 112. First, an estimate of the communicated symbol, $R_n$, is obtained by a simple slicing mechanism 120. This value, along with the computed slicer error, en, are provided to the Zero-Forcing Adaptation block 104. This block updates the coefficients of the Analog FIR EQ 102 using Equation Set 1. These equations define the tap update for an FIR EQ with 1 pre-cursor tap, 1 post-cursor tap, and 1 cursor tap. Those skilled in the art will quickly recognize how these equations are extended for FIR EQs with additional pre and post cursor taps.

$$\text{Pre}' = \text{Pre} + \mu \cdot \epsilon_n \cdot R_{n+1}$$

$$\text{Curs}' = \text{Curs} + \mu \cdot \epsilon_n \cdot R_n$$

$$\text{Post}' = \text{Post} + \mu \cdot \epsilon_n \cdot R_{n-1} \quad \quad \text{Equation Set 1}$$

In Equation Set 1, the 'μ' term controls the update rate and is a positive non-zero term whose value is typically significantly less than 1.

Consider the use of the system of FIG. 1A in applications where the communication baud rate can range over a large span of frequencies, say a decade. Often, it is desirable to have an Analog FIR tap spacing that is approximately equal to the baud duration for rates at the high end of the data rate range as this is often easier to implement and better suited for operation at the highest data rates where channel attenuation is typically worse. Since the tap spacing of the Analog FIR typically cannot be easily changed, operation at low baud rates becomes problematic especially if the channels intended for low baud rate operation are characterized by heavy attenuation at 50% of the baud rate. In this situation, adaptation of the Analog FIR by the system of FIG. 1A often results in diverging adapted coefficients. In summary, this method of adaptation works well when the Analog FIR has approximately baud rate tap spacings, but does not work well when the Analog FIR has fractional spacing (baud duration is much larger than tap spacing).

A solution is required that allows reliable adaptation of the Analog FIR at relatively low baud rates, such as below 5 GHz when the upper range of operation is 28 GHz. Said solution must also avoid the issue of interaction with concurrent timing recovery due to the nature of fractional spaced FIR filters that are known to those skilled in the art from e.g. Ungerboek.

Various embodiments disclosed herein exploit the simplicity of the basic zero-forcing adaptation method, described in relation to FIG. 1A and Equation Set 1. In contrast to the receiver of FIG. 1A, some embodiments described herein can operate at baud rates much lower than the baud rate design of the analog FIR EQ by introducing coefficient adaptation constraints preventing the undesired divergence of coefficient adaptation without unduly restricting normal operation.

Some embodiments of the invention apply primarily to adaptation of analog FIR EQs with up to 1 pre-cursor tap and up to 1 post-cursor tap.

Figure 1B:
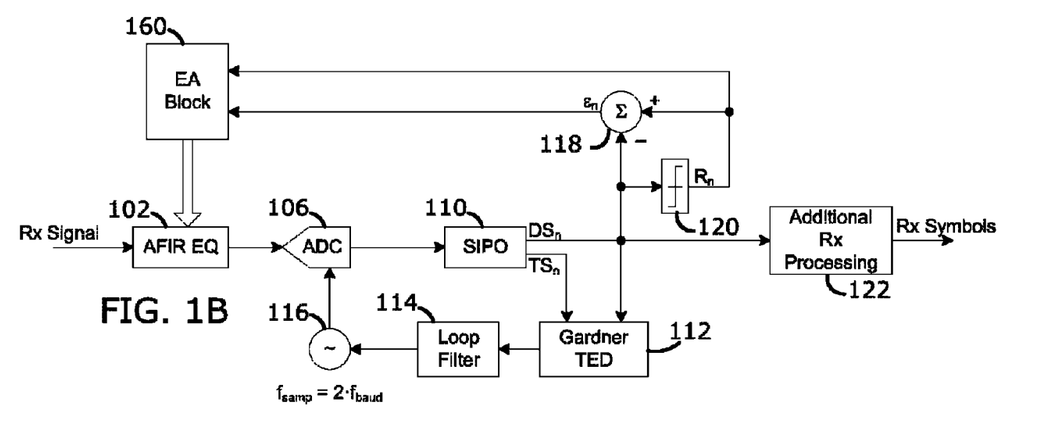
FIG. 1B illustrates a block diagram of a receiver, according to various embodiments.

FIG. 1B illustrates a block diagram of a receiver 150, according to various embodiments, for use in a Ser/Des. Receiver 150 includes an analog FIR 102, Equalizer Adaptation block ("EA block") 160, an analog to digital converter 106, SIPO 110, a Gardner TED 112, a loop filter 114, sampling signal source 116, a summer 118 for generating a computed slicer error, $\epsilon_n$, and slicer 120 for generating an estimate of the communicated symbol, $R_n$. Gardner TED 112 and loop filter 114 can be referred to collectively as the timing recovery. Accordingly, receiver 150 includes many similar features to those of receiver 100. However, receiver 150 includes EA block 160 instead of Zero-Forcing Adaptation block 104. EA block 160 is configured, as explained in greater detail below, in a manner that allows receiver 150 to be operated over a range for frequencies.

Further to the embodiments illustrated in FIG. 1B several extensions and variations are disclosed in the following figures and their related description. Many of these extensions and variations provide further advantages in implementation complexity for different applications.

While applying the zero-forcing adaptation defined by Equation Set 1, two sets of constraints are enforced by EA block 160. Together, these constraints advantageously stabilize the Analog FIR EQ coefficient adaptation at low baud rate operation. In various embodiments, when data rates are closer to the baud rate design of the Analog FIR EQ, EA block 160 removes or disables these constraints. In other embodiments, when data rates are closer to the baud rate design of the Analog FIR EQ, EA block 160 maintains the constraints in place as they will not unduly constrain adaptation in these conditions.

In various embodiments, the adaptation constraint is a two-step process.

First, EA block 160 constrains the pre-cursor and post-cursor taps to be non-positive. That is, they are restricted to have values of zero or less. The basic zero-forcing algorithm given in Equation Set 1 of ZF block 104 is modified as given in Equation Set 2 for EA block 160. Note that a constraint is also applied to the cursor tap. The constraint of a positive only cursor coefficient is typically assumed in the ZF algorithm and is only included here for clarity.

$$\text{Pre}'=\min(\text{Pre}+\mu\cdot\epsilon_n\cdot R_{n+1},0)$$

$$\text{Curs}'=\max(\text{Curs}+\mu\cdot\epsilon_n\cdot R_n,0)$$

$$\text{Post}'=\min(\text{Post}+\mu\cdot\epsilon_n\cdot R_{n-1},0) \quad\quad \text{Equation Set 2}$$

In typical applications, the desired Analog FIR EQ will have a high-pass frequency response to compensate for a low-pass channel characteristic. An analog FIR EQ with a positive cursor tap and negative pre/post cursor taps will have a characteristic high pass response, so the imposed limits of Equation Set 2 will have no detrimental impact on operation.

In addition to constraining the pre and post cursor tap values to a maximum of zero, in various embodiments, EA block 160 further constrains the tap according to Equation 3. In various embodiments, the cursor tap is set to a particular value and therefore, in such embodiments, Equation 3 provides a constraint with respect to the pre and post cursor taps.

$$\text{Pre}+\text{Post}>K-\text{Curs} \quad\quad \text{Equation 3}$$

where K is a small positive value. The constraint of Equation 3 insures that the sum of the coefficients has a non-zero positive value greater than K.

It is important to note that the individual values of the Pre and Post cursor coefficients are not constrained by Equation 3, only their sum. This allows the adaptation algorithm of EA block 160 to find the optimal relative values of the Pre and Post cursor coefficients given the constraint on their sum.

Those skilled in the art will recognize that as smaller and smaller values of K are specified, the Analog FIR will be allowed to adapt to have smaller and smaller DC (i.e. 0 Hz) response relative to its maximum response at $1/(2\cdot\text{tau})$ Hz, where tau is the analog FIR tap spacing in seconds. To maintain reasonable signal amplitude for ADC sampling, the analog FIR cursor tap will have to provide a large gain to compensate. This may place a burden on the design of the analog FIR EQ.

Perturbation testing of the Gardner based timing recovery mechanism shows that the classic problem of interaction between timing recovery and adaptation of the fractional spaced Analog FIR taps is avoided with various embodiments disclosed herein. During adaptation, a timing offset can be introduced into the timing recovery loop. After a period of Analog FIR adaptation, the timing offset can then be removed and adaptation of the Analog FIR can continue. Ideally, the final steady state timing alignment and Analog FIR coefficient values are the same for all test trials, independent of the initially imposed timing offset. This desirable result was observed for the disclosed invention.

Figure 2:
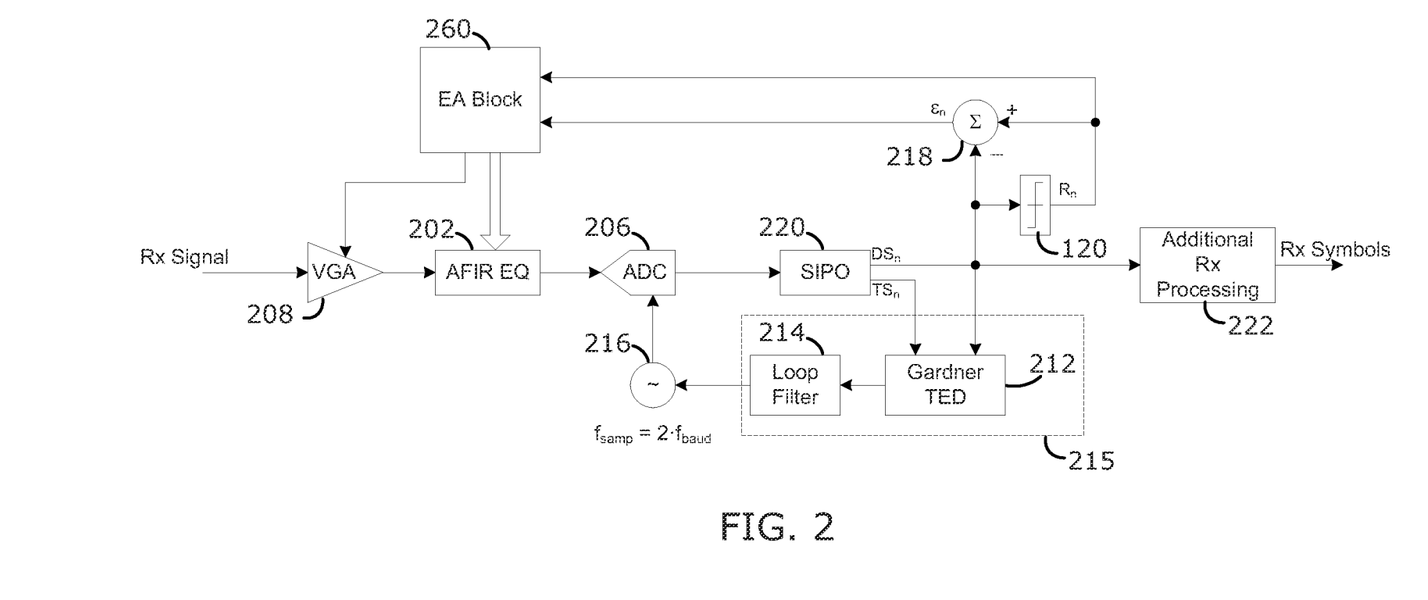
FIG. 2 illustrates a block diagram of a receiver, according to various other embodiments.

FIG. 2 illustrates a block diagram of receiver for Ser/Des, according to various embodiments. Various embodiments illustrated in FIG. 2 are a variation on the invention that provides simplification of the analog FIR and of its adaptation, while also mitigating the potential problem of a large gain required by the cursor tap. In the embodiments of FIG. 2, the analog FIR cursor tap is fixed at unity gain and a Variable Gain Amplifier 208 is introduced. Various embodiments of FIG. 2 are very similar to the embodiments of FIG. 1B, with the exception of the above mentioned alterations.

In the embodiments illustrated in the FIG. 2, the VGA 208 is shown preceding the Analog FIR 208, however, from an algorithmic perspective the VGA 208 could also follow the Analog FIR 208. Accordingly, in various other embodiments, the VGA follows the Analog FIR.

For the embodiments illustrated in FIG. 2, the coefficient adaptation equations of EA block 260 are defined by Equation Set 4 and Equation 5. Note that the cursor tap of the Analog FIR 206 is now fixed at a unity value. Equation Set 4 includes the following:

$$\text{Pre}'=\min(\text{Pre}+\mu\cdot\epsilon_n\cdot R_{n+1},0)$$

$$\text{Curs}'=1$$

$$\text{Post}'=\min(\text{Post}+\mu\cdot\epsilon_n\cdot R_{n-1},0)$$

$$G_{vga}'=\max(G_{vga}+\mu\cdot\epsilon_n\cdot R_n,0) \quad\quad \text{Equation Set 4}$$

Equation 5 includes the following:

$$\text{Pre}+\text{Post}>K-1 \quad\quad \text{Equation 5}$$

In Equation Set 4, $G_{vga}$ has been introduced to represent the gain control coefficient of the VGA 208. One of the benefits of this form of implementation is that there is a direct relationship between the value of K and the DC response of the Analog FIR 202. Previously, the DC response of the Analog FIR was jointly dependent on the value of K and the value of the Analog FIR cursor coefficient. Another benefit of this form of implementation is that the constraint of Equation 5 is relative to a fixed value, K−1, allowing for potentially more efficient implementations of the constraint.

As an example of how a more efficient implementation can result, consider the following example. In an embodiment, a simple table indexed by the Pre & Post values unconstrained by Equation 5 could be used. The contents of the table would contain the appropriate constrained values. If the cursor tap is not fixed at 1, this table would also have to be indexed by the cursor value, thus the table will be significantly bigger.

Figure 3:
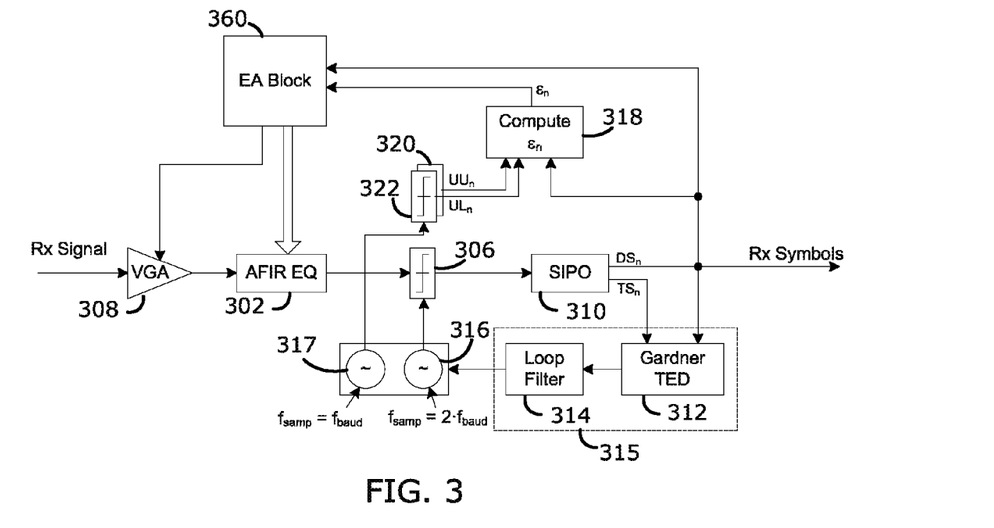
FIG. 3 illustrates a block diagram of a receiver, according to various other embodiments.

In some applications, there is not a need for additional Rx processing of the ADC sampled data to sufficiently extract the transmitted information with a prescribed Bit Error Rate (BER). For example, sufficient data recovery may be possible with a simple slicer. In this application, it is not necessary to use an ADC to sample the received signal. FIG. 3 illustrates such embodiments.

FIG. 3 illustrates a block diagram of various embodiments of a Ser/Des receiver 300 in which the ADC (e.g. ADC 106 and 206 of FIGS. 1 and 2 respectively) is replaced by a simple slicer 306. The required clocking rate of slicer 306 which may also be referenced to as the main sampler, is two times the baud rate which is the same as the case for ADC sampling. The Gardner based timing recovery is able to operate with simple sliced data instead of the ADC sampled data so no fundamental change is required in that portion of the circuit. Zero-Forcing adaptation of the Analog FIR and VGA is also possible, but additional information is required. The additional information required is provided by utility samplers 320 and 322 (1-bit slicers) providing samples $UU_n$ and $UL_n$, respectively.

Receiver 300 also includes two signal sampling sources 316 and 317. Sampling source 316 produces a sampling frequency at twice the baud rate ($f_{samp}=2f_{baud}$). Sampling source 317 produces a sampling frequency at the baud rate ($f_{samp}=f_{baud}$). As explained in greater detail below, the reason for this difference is that the main sampler 306 samples at twice the rate of the utility samples 320 and 322.

Figure 4:
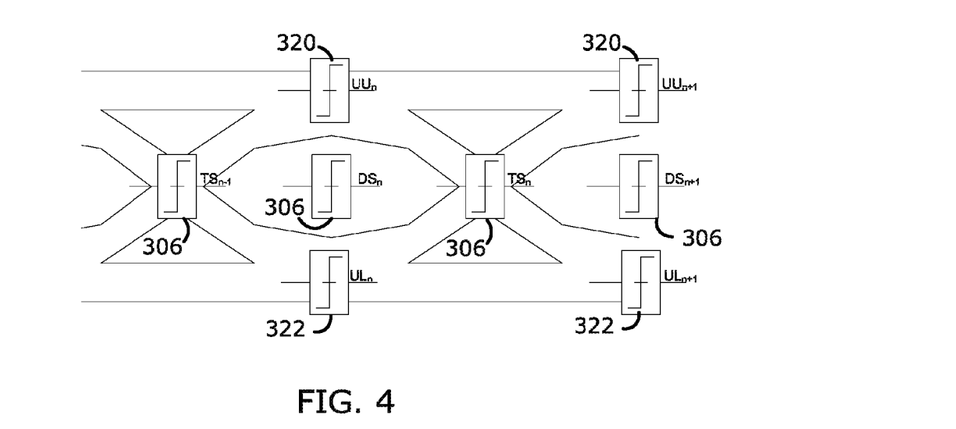
FIG. 4 a schematic diagram illustrating the relationship between the utility samplers and the main sampler of the receiver of FIG. 3.

FIG. 4 is a schematic diagram illustrating the relationship between the utility samplers 320 and 322 and the main sampler 306. As shown, the utility samplers 320 and 322 are aligned in time with the baud center data sampler. As only 1 sample per baud period is required for the utility samplers 320 and 322, FIG. 4 shows these samplers being clocked at the baud rate. The threshold levels of the utility samplers 320 and 322 are set to the positive and negative median voltage levels at the center of the baud interval. As mentioned above, and illustrated in FIG. 4, main sampler 306, is sampled at twice the baud rate and produces two samples $TS_n$ and $DS_n$. FIG. 4 illustrates two baud intervals and therefore utility samplers 320 and 322 are illustrated as each producing 2 samples each and main sampler 306 is illustrated as producing a total of 4 samples.

Referring again to FIG. 3, error computation block 318 computes the error signal $\epsilon_n$, based on samples $UU_n$, $UL_n$ and $DS_n$ and provides the error signal to EA block 360. Computation of the error signal, $\epsilon_n$, and subsequent ZF adaptation and application of defined constraints by computation block 318 and EA block 360 is defined in Equation Set 6 and Equation 7. Those skilled in the art will recognize the similarity of the adaptation equations with those previously defined for the ADC based receiver in Equation Set 4 and Equation 5. The computation of the error term is significantly different as it is based on binary samples instead of multilevel ADC samples. For the error term in Equation Set 6, the terms inside the square brackets, [ ], yield Boolean values that are then converted to unit amplitude signed values. Thus, the computed error term, $\epsilon_n$, will always have a value of $\pm 1$.

Equation Set 6 includes the following:

$$\epsilon_n = \{1 - 2 \cdot [(UU_n \cap DS_n) \cup (UL_n \cap \text{not}(DS_n))]\}$$

$$\text{Pre}' = \min(\text{Pre} + \mu \cdot \epsilon_n \cdot DS_{n+1}, 0)$$

$$\text{Curs}' = 1$$

$$\text{Post}' = \min(\text{Post} + \mu \cdot \epsilon_n \cdot DS_{n-1}, 0)$$

$$G_{vga}' = \max(G_{vga} + \mu \cdot \epsilon_n \cdot DS_n, 0) \qquad \text{Equation Set 6}$$

Equation 7 includes the following:

$$\text{Pre} + \text{Post} > K - 1 \qquad \text{Equation 7}$$

Controlling the Maximum Adaptable Peaking Gain

In general, the maximum gain response of the analog FIRs of various embodiments disclosed herein will occur at $1/(2 \cdot \tau)$ Hz, where tau is the analog FIR tap spacing in seconds. This is independent of the baud rate of the received signal being equalized. Under conditions of strong receiver noise and/or channel cross-talk, it may not be desirable to allow the adaptation of the analog FIR to fully adapt to compensate for channel loss. Those skilled in the art will recognize that the Zero Forcing adaptation algorithm does not consider the impact of noise enhancement and thus receiver noise and/or channel cross-talk impairments may be too strongly emphasized at higher frequencies. To help mitigate this problem, various embodiments described herein provide a simple method of limiting the equalization strength of the adapted analog FIR. For the embodiments of FIG. 2 in which the cursor tap is fixed at a unity value, the relative peaking of the analog FIR is given by Equation 8.

$$PeakingGain_{dB} = 20 \cdot \log_{10} \left[ \frac{1 - \text{Pre} - \text{Post}}{1 + \text{Pre} + \text{Post}} \right] \qquad \text{Equation 8}$$

Given the relation defined in Equation 8, the maximum adaptable peaking gain can be controlled through appropriate selection of K, as defined in Equation 9.

$$MaxPeakingGain_{dB} = 20 \cdot \log_{10} \left[ \frac{2}{K} - 1 \right] \qquad \text{Equation 9}$$

Re-arranging Equation 9 yields Equation 10:

$$K = \frac{2}{10^{(MaxPeakingGain_{dB}/20)} + 1} \qquad \text{Equation 10}$$

For example, if the maximum desired equalizer peaking is 9.5 dB, selecting a value of K=0.5 will enforce this limit.

Combining with Other Adaptation Methods

U.S. patent application Ser. No. 13/941,902 with title "METHOD FOR REDUCING JITTER IN RECEIVERS", which is incorporated herein by reference in its entirety, discloses a method of adapting analog and digital FIR EQs based upon the non-zero-crossing transition between baud intervals instead of the traditional method of adaptation based on center eye data samples as described herein. Such an adaptation approach is expected to have the same issue as described herein when applying at data rates much lower than the baud rate design of the Analog FIR. Inclusion of the herein described adaptation constraints will enable stable operation of the non-zero-crossing adaptation method at very low baud rates relative to the Analog FIR design.

Extension to Multi-Level Signaling

The primary focus of various embodiments disclosed herein is their application to NRZ (non-return to zero) based SerDes. With NRZ, data recovery can be achieved with single-threshold slicers as given in FIG. 3. Additional slicers are required to adapt the analog FIR and VGA, but the total count of voltage comparators is kept to a small number.

The invention can also be applied to multi-level signaling based SerDes, such as PAM4 in which 2-bits of information are encoded into one of 4 voltage levels. The application and adaptation of an analog FIR is conceptually identical to the case of NRZ with the primary exception being the computation of the error term, $\epsilon_n$. To be able to properly compute the error term, either an ADC based receiver is used, or additional slicers are used.

Parallelization for Very High Speed Operation

The concept of various embodiments disclosed herein is presented in a serialized form in which the SerDes receiver decodes a single baud at a time. For operation at very high data rates, it is often required to parallelize the computation and simultaneously process many baud periods at a time. While this does not impact the operation of the analog FIR (which is inherently serial), it does have an impact on the implementation of the adaptation circuit. The adaptation equations presented herein are easily implemented in such a parallel structure.

Figure 5:
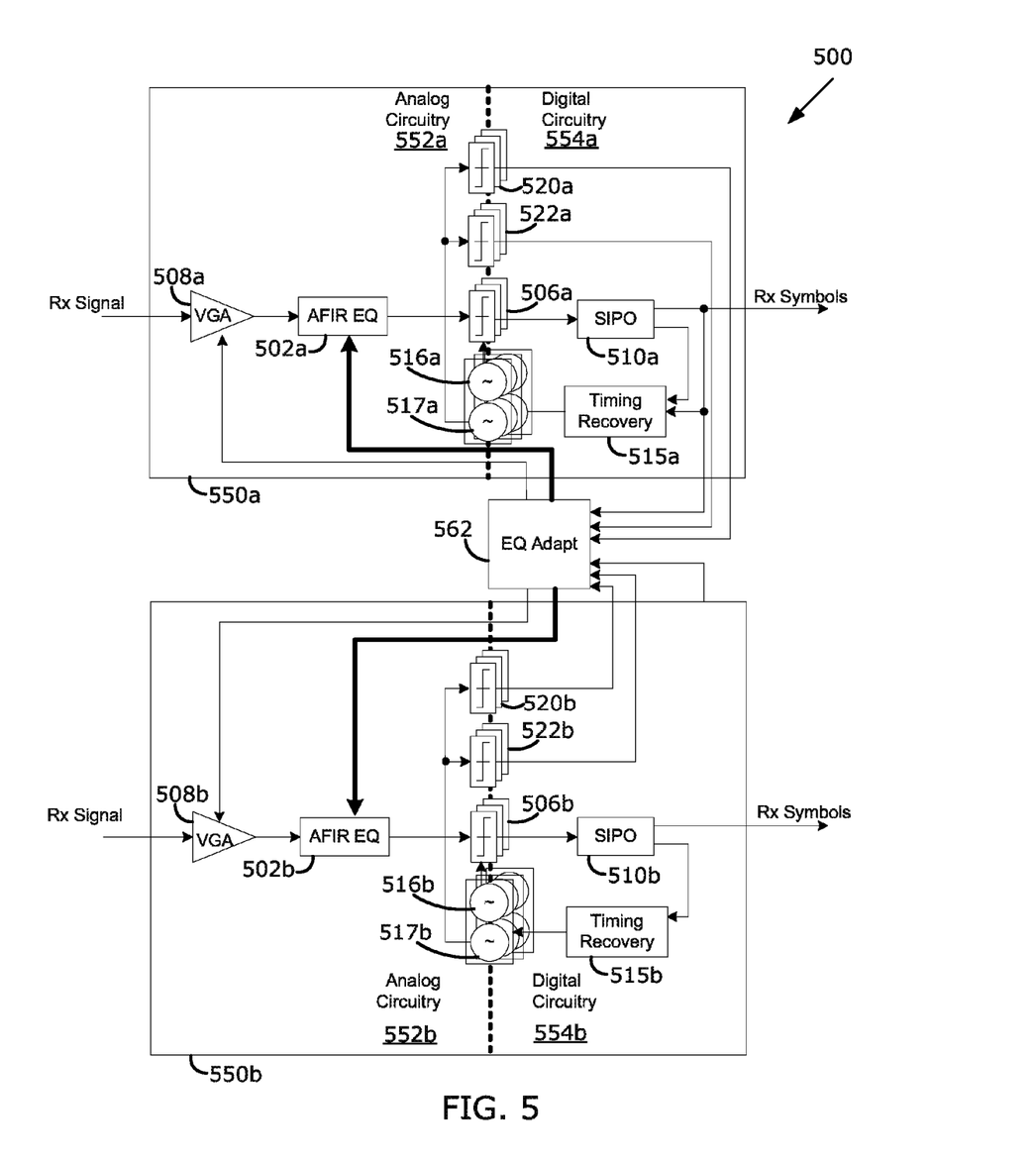
FIG. 5 is a block diagram of dual SerDes receiver, according to various embodiments.

FIG. 5 illustrates a block diagram of dual SerDes receiver 500, according to various embodiments. The architecture of the circuit of FIG. 5 can be considered an adaptation of the slicer based version of FIG. 3. In various embodiments of FIG. 5, adaptation of the SerDes is not required continuously, therefore in the embodiments illustrated, there is a single instance of the adaptation engine (also referred to as an EQ adaptation block) 560 shared by two duplicate SerDes receivers 550a and 550b. In other embodiments, a greater number duplicate SerDes receivers share a single adaptation engine 560. The timing recover circuits 515a and 515b, each include a Gardner TED and a loop filter.

Each of receivers 550a and 550b are similar to receiver 300 of FIG. 3 in that they each include similar components SerDes receiver 300; however, unlike receiver 300, they share the single adaptation block 562. In addition, receiver 500 does not include a separate error computation block, such as error computation block 318 of FIG. 3, for computing the error term. Instead, adaptation block 562 includes this functionality. In other embodiments, a separate computation block is used. For example, each of receivers 550a and 550b can include their own computation block.

FIG. 5 also illustrates that some embodiments of the SerDes receiver are divided between analog circuitry (552a and 552b) and digital circuitry (554a and 554b). Other embodiments disclosed herein, such as for example, those of FIG. 3, can be similarly divided.

Some embodiments of the circuit for FIG. 5 are fully integrated in a CMOS device having a geometry of 40 nm or 28 nm. The integrated receiver would also include the VGA and analog FIR EQ. While it is possible to drive the adaptation of the analog FIR using software assist with capture data in some embodiments, some other embodiments would have the adaptation engine fully implemented in RTL standard gates.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A SerDes receiver comprising:
an input for receiving a signal, the signal having a baud rate;
an Analog Finite Impulse Response equalizer (AFIR) for equalizing the received signal, the AFIR comprising:
a pre-cursor tap having a pre-cursor coefficient;
a cursor tap having a cursor coefficient, the cursor coefficient being constrained to a non-negative value; and
a post-cursor tap having a post-cursor coefficient;
an equalizer adaptation block coupled to the AFIR, the equalizer adaptation block configured to adjust the pre-cursor coefficient and the post-cursor coefficient based on the received signal, the adaptation block further being configured to constrain the values of the pre-cursor and post-cursor coefficients to be non-positive;
wherein the sum of the pre-cursor, cursor, and post-cursor coefficients is constrained to be greater than K, wherein K is greater than 0.

2. The SerDes receiver of claim 1, further comprising a variable gain amplifier (VGA) for amplifying the received signal.

3. The SerDes receiver of claim 2, wherein the cursor coefficient is set to a fixed value.

4. The SerDes receiver of claim 3, wherein the fixed value is 1.

5. The SerDes receiver of claim 2, wherein an input the VGA is coupled to an output of the AFIR for amplifying the received signal after equalization.

6. The SerDes receiver of claim 2, wherein an output of the VGA is coupled to an input of the AFIR for amplifying the received signal prior to equalization.

7. The SerDes receiver of claim 1, wherein K is selected based on a maximum peaking gain of the AFIR, according to the relationship:

$$= \frac{2C}{10^{(MaxPeakingGain_{dB}/20)} + 1},$$

wherein C is a cursor coefficient value.

8. The SerDes receiver of claim 4, wherein K is selected based on a maximum peaking gain of the AFIR, according to the relationship:

$$K = \frac{2}{10^{(MaxPeakingGain_{dB}/20)} + 1}.$$

9. The SerDes receiver of claim 1, further comprising a digitizing block for digitizing the equalized signal.

10. The SerDes receiver of claim 9, wherein the digitizing block comprises an analog to digital converter.

11. The SerDes receiver of claim 9, wherein the digitizing block comprises a slicer.

* * * * *